3,332,140
PROCESS FOR FIXING CONTACT POINT
Shinzo Sugiura, Okazaki-shi, Aichi-ken, and Masayoshi Nagai, Kariya-shi, Aichi-ken, Japan, assignors to Nippon Denso Kabushiki Kaisha, Aichi-ken, Japan, a corporation of Japan
Filed Aug. 24, 1964, Ser. No. 391,445
Claims priority, application Japan, May 22, 1964, 39/28,756
1 Claim. (Cl. 29—471.7)

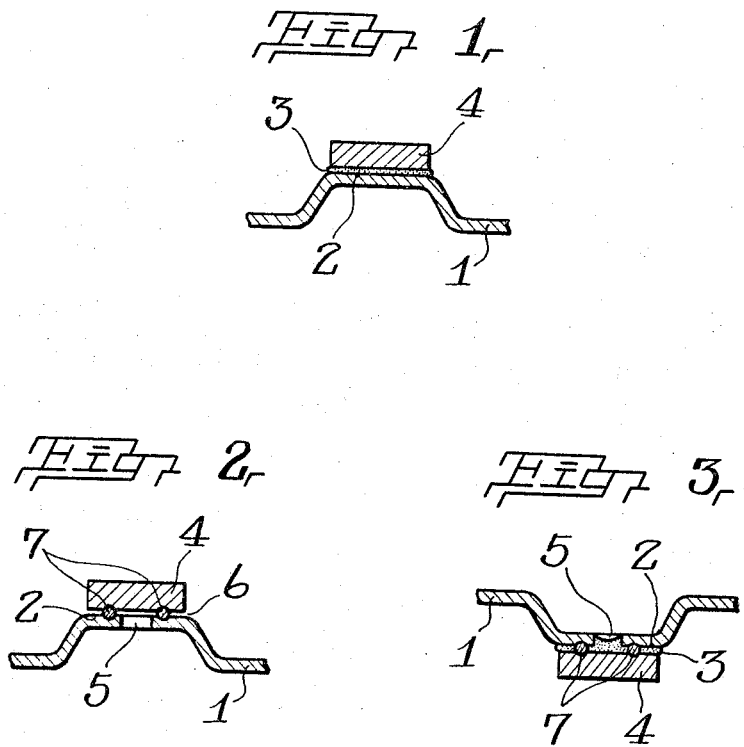

The present invention relates to improvements in the process for fixing contact point used in automobiles, various electrical appliances, and the like such as the contact breaker of ignition distributors or relays more particularly, such contacts are a tungsten contact which can not be given a sufficient welding strength by the welding method that has been developed previously.

The conventional fixing process for contact point such as above mentioned is carried out, as is shown in FIG. 1, by mounting a filler metal 3 onto the raised portion 2 of the contact base 1, then laying a contact 4 upon the said filler metal 3, putting it into a furnace while in a suitable brazing jig, and brazing at a high temperature of about 1130° C. However it is not possible to correct the position thereof in the furnace and used to be the defect that the position of the contact point would be incorrect thereby causing sometimes numerous contact points of inferior quality to be produced on account of (A) the unsettledness of the shape of the raised portion of the contact base 1; (B) shock caused when the contact 4, the brazing metal 3 and the contact base 1, all preliminarily combined, are moved into the furnace; and (C) distortion or deformations of the jig used in the furnace when brazing. In the prevention of such positional slips due to the above mentioned reasons, utmost attention must be paid to forestall the positional slip, floating or inclination of contacts during the subassembling process before throwing into the furnace; and operators are obliged to use precise jigs made of a thermal resistance material such as stainless steel, graphite plate, because of which a relatively large man-hour operation would be required and expenses would increase.

The present invention will be better understood and objects and advantages hereof will become apparent by the following illustration taken in connection with the drawings in which:

FIG. 1 is a vertical sectional view of a contact point according to the fixing process that has been heretofore universally known;

FIG. 2 is a vertical sectional view of a contact point at the time of being temporarily fixed according to the method of securing of the present invention; and FIG. 3 is a vertical sectional view of a contact point according to the present invention.

The present invention is directed to brazing after temporarily fixing a contact onto the contact base in order to eliminate the above mentioned defect, and therefore, an illustration of a preferred embodiment of the present invention will hereinafter be made in reference with FIG. 2: 1 is the contact base; 5 is a pouring hole for pouring the filler metal, provided by boring a hole in the center of the raised portion 2 of the said base 1; the contact 4 is mounted onto the raised portion 2 with the said pouring hole 5 as a center; and the contact 4 is temporarily fixed onto the raised portion of the base at an exact position using a suitable welding jig by resistance welding or the like in a way such that a proper gap 6 is provided for the inflow and diffusion of the filler metal between the contact 4 and the raised portion 2 of the base and the welding position 7 is to be as local as possible. Now, as is shown in FIG. 3, the contact 4 can be brazed to the raised portion 2 of the base by laying the filler metal 3 on the side of the said pouring hole 5 opposite the contact, putting it into a furnace, melting the said filler metal 3, and inflowing and diffusing the filler metal into the gap 6.

The conditions under which the brazing for obtaining excellent results could be realized may be, as an numerical example as follows: the resistance welding for temporarily fixing the contact is effected with a welding current of 20,000–30,000 A., the welding time of 0.002–0.004 sec., the welding pressure of 30 kg./cm.$^2$, the material for the welding electrodes being chromium-copper alloy, resistance against load of more than 6 kg. in the welding strength, and maintenance of the gap 6 at less than about 0.05 mm., and so forth.

As the foregoing description goes, the fixing process for the contact point of the present invention has been so arranged that brazing is carried out in the furnace after a temporary fixing has been done at normal temperature for the purpose of determining the position of a contact, so that the present process is advantageous in that such brazing jigs which require precision and also thermal resistance costly material may be dispensed with, and the present process furthermore is highly effective since it can save the man-hours that need delicate care and attention in the assembling process before brazing so as to enable to automatize the subassembling process for brazing that has been heretofore regarded as impossible.

What is claimed is:

A process for mounting a contact point on a base which comprises providing the base with a hole therethrough, positioning a contact on said base over said hole therein, temporarily fixing the contact to the base by resistance welding in such a manner as to space the contact from the base, placing a filler metal at the base hole on a side of the base opposite to the contact with the contact below the filler metal, thereafter melting the filler metal whereby the filler metal flows through the base hole to between the contact and the base and cooling the filler metal to harden the same.

References Cited
UNITED STATES PATENTS

| | | | |
|---|---|---|---|
| 1,155,427 | 10/1915 | Liebmann et al. | 29—155.55 |
| 1,936,018 | 11/1933 | Hodgson | 29—500 X |
| 2,414,463 | 1/1947 | Gunn et al. | 29—155.55 X |
| 2,575,808 | 11/1951 | Halverson et al. | |
| 2,627,110 | 2/1953 | Hickey | 29—501 X |
| 2,662,277 | 12/1953 | Stone | 29—501 X |
| 3,045,340 | 7/1962 | Kolling | 29—471.7 X |
| 3,184,831 | 5/1965 | Siebertz | 29—471.9 X |

JOHN F. CAMPBELL, Primary Examiner.

L. J. WESTFALL, Assistant Examiner.